(12) United States Patent
Kim

(10) Patent No.: US 9,164,608 B2
(45) Date of Patent: Oct. 20, 2015

(54) APPARATUS AND METHOD FOR ADJUSTING TOUCH SENSITIVITY IN MOBILE TERMINAL

(71) Applicant: Samsung Electronics Co., Ltd., Gyeonggi-do (KR)

(72) Inventor: Dae-Yun Kim, Daejeon (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 178 days.

(21) Appl. No.: 13/746,585

(22) Filed: Jan. 22, 2013

(65) Prior Publication Data

US 2013/0187882 A1 Jul. 25, 2013

(30) Foreign Application Priority Data

Jan. 25, 2012 (KR) .................. 10-2012-0007170

(51) Int. Cl.
*G06F 3/041* (2006.01)
*G06F 3/0484* (2013.01)

(52) U.S. Cl.
CPC .............. *G06F 3/041* (2013.01); *G06F 3/0416* (2013.01); *G06F 3/0418* (2013.01); *G06F 3/04847* (2013.01)

(58) Field of Classification Search
CPC ..... G06F 3/041; G06F 3/0416; G06F 3/0418; G06F 3/04847
USPC ............................................. 345/173
See application file for complete search history.

(56) References Cited

U.S. PATENT DOCUMENTS

| 6,424,338 | B1 | 7/2002 | Anderson |
| 2008/0165154 | A1 | 7/2008 | Kim |
| 2008/0278454 | A1* | 11/2008 | Lee et al. ............... 345/173 |
| 2008/0305836 | A1* | 12/2008 | Kim et al. ............... 455/564 |
| 2010/0007612 | A1 | 1/2010 | Locker et al. |
| 2010/0149130 | A1 | 6/2010 | Jung et al. |
| 2010/0283752 | A1* | 11/2010 | Maeda ................... 345/173 |
| 2011/0032199 | A1 | 2/2011 | Seo et al. |
| 2011/0261058 | A1 | 10/2011 | Luo |
| 2011/0304550 | A1 | 12/2011 | Romera Jolliff et al. |
| 2012/0268411 | A1* | 10/2012 | Chen et al. ............... 345/174 |

* cited by examiner

*Primary Examiner* — Long D Pham
(74) *Attorney, Agent, or Firm* — Cha & Reiter, LLC.

(57) ABSTRACT

An apparatus for adjusting touch sensitivity in a mobile terminal apparatus includes a touch sensitivity adjuster for adjusting touch sensitivity of a touch screen unit, and a controller controlling the touch sensitivity adjuster to selectively adjust the touch sensitivity according to an input method.

15 Claims, 3 Drawing Sheets

APPARATUS AND METHOD FOR ADJUSTING TOUCH SENSITIVITY IN MOBILE TERMINAL

CLAIM OF PRIORITY

This application claims the benefit under 35 U.S.C. §119(a) of a Korean Patent Application filed in the Korean Intellectual Property Office on Jan. 25, 2012 and assigned Serial No. 10-2012-0007170, the entire disclosure of which is hereby incorporated by reference.

BACKGROUND OF THE INVENTION

1. Field of the Invention

The present invention relates generally to an apparatus and method for adjusting touch sensitivity in a mobile terminal, and more particularly, to an apparatus and method capable of adjusting touch sensitivity depending on an input method of a mobile terminal.

2. Description of the Related Art

Recently, a touch screen has been applied to various terminals such as mobile phones, smart phones, unmanned Automatic Teller Machines (ATMs), palm Personal Computers (PCs), and Personal Digital Assistants (PDAs) as an input means. Examples of a terminal with a touch screen may include electronic organizers, mobile terminals, PDAs, etc.

The touch screen provides a user interface that allows a user to input commands and information by touching icons displayed on a screen of the terminal with his or her finger or a stylus pen. In line with the growing trend of miniaturization and lightweight of mobile terminals, the touch screen unit should be more reduced in both size and weight.

In mobile terminals with a touch screen, the touch screen uses, as its input methods, a tap input method (e.g., touch input method) in which a touch is released within a predetermined time period, and a move input method (e.g., drag input method) in which a touch is released after a lapse of a predetermined time period.

In the case of the tap input method which is used to input characters and symbols using a key input unit displayed on the touch screen, if touch sensitivity is low and when two adjacent keys on the touch screen are input or touched fast, each input or touch may be recognized not as a point but as a line. Therefore, a character or symbol for only one of the two input keys may be input input accuracy. Thus, the touch sensitivity should be increased in order to increase input efficiency.

In the case of the tap input method which is used to input characters and symbols using a key input unit displayed on the touch screen, if touch sensitivity is low and when two adjacent keys on the touch screen are input or touched fast, each input or touch may be recognized not as a point but as a line. Therefore, a character or symbol for only one of the two input keys may be input. Thus, the touch sensitivity should be increased in order to increase input efficiency.

As described above, adjusting the touch sensitivity has a trade-off relationship between the tap input method and the move input method. In the conventional mobile terminals, therefore, touch sensitivity of an intermediate level is only set as a default level of the touch sensitivity.

SUMMARY OF THE INVENTION

An aspect of exemplary embodiments of the present invention is to provide a touch sensitivity adjusting apparatus and method capable of adjusting touch sensitivity depending on an input method in a mobile terminal.

In accordance with one aspect of the present invention, an apparatus for adjusting touch sensitivity in a mobile terminal includes a touch sensitivity adjuster for selectively adjusting touch sensitivity of a touch screen unit; and a controller for controlling the touch sensitivity adjuster to adjust the touch sensitivity according to an input method.

In accordance with another aspect of the present invention, a method for selectively adjusting touch sensitivity in a mobile terminal includes determining an input method occurring on a touch screen unit; and adjusting touch sensitivity according to the input method.

BRIEF DESCRIPTION OF THE DRAWINGS

The above and other aspects, features and advantages of certain exemplary embodiments of the present invention will be more apparent from the following description taken in conjunction with the accompanying drawings, in which.

DETAILED DESCRIPTION OF EXEMPLARY EMBODIMENTS

Figure 1:
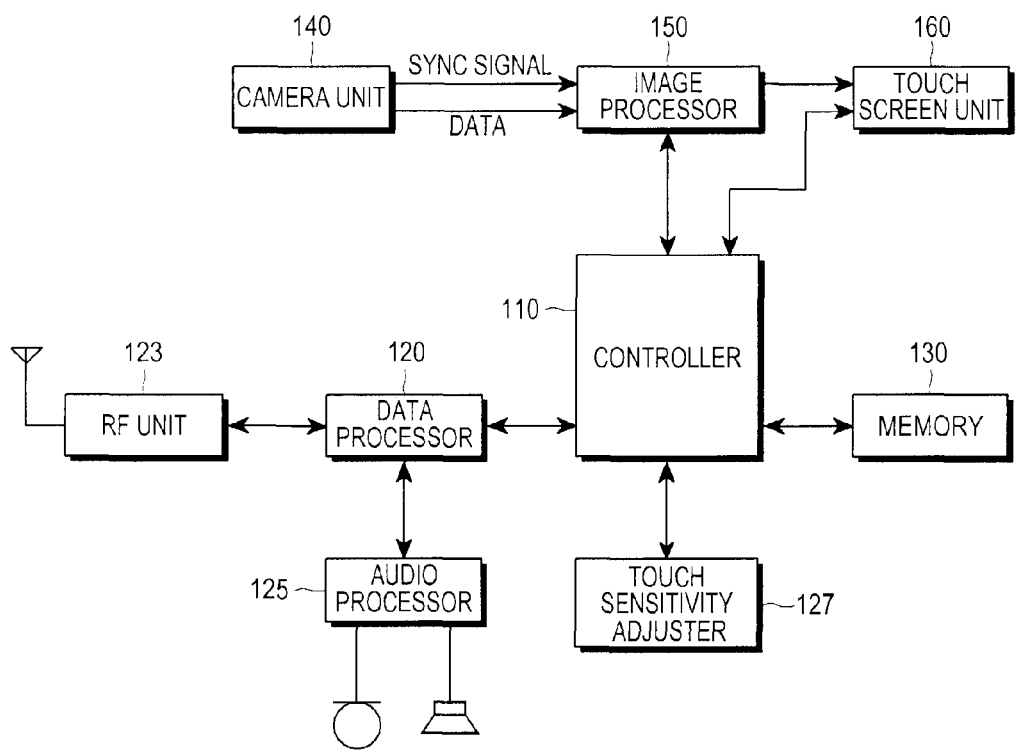
FIG. 1 illustrates a structure of a mobile terminal according to an embodiment of the present invention.

Exemplary embodiments of the present invention will now be described in detail with reference to the accompanying drawings. Like reference numerals refer to the like elements throughout the drawings.

Among the terms set forth herein, a terminal refers to any kind of device capable of processing data which is transmitted or received to or from any external entity. The terminal may display icons or menus on a screen to which stored data and various executable functions are assigned or mapped. The terminal may include a computer, a notebook, a tablet PC, a mobile device, and the like.

FIG. 1 illustrates a structure of a mobile terminal according to an embodiment of the present invention.

In operation, a Radio Frequency (RF) unit 123 is responsible for wireless communications of the mobile terminal. The RF unit 123 includes an RF transmitter for up-converting a frequency of transmission signals and amplifying the up-converted signals, and an RF receiver for low-noise-amplifying received signals and down-converting a frequency of the low-noise-amplified signals. A data processor 120 includes a transmitter for encoding and modulating the transmission signals, and a receiver for demodulating and decoding the received signals. To this end, the data processor 120 may include a modem (modulator/demodulator) and a codec (coder/decoder). The codec includes a data codec for processing data signals such as packet data, and an audio codec for processing audio signals such as voice. An audio processor 125 plays received audio signals output from the audio codec in the data processor 120 using a speaker SPK, and transfers transmission audio signals picked up by a microphone MIC to the audio codec in the data processor 120.

A memory 130 may include a program memory and a data memory. The program memory may store programs for controlling the overall operation of the mobile terminal, and programs for controlling or adjusting touch sensitivity depending on an input method (or an action based thereon) occurring on a touch screen unit in accordance with an embodiment of the present invention. The data memory temporarily stores data generated during execution of the programs.

A controller 110 controls the overall operation of the mobile terminal

In accordance with an exemplary embodiment of the present invention, the controller 110 adjusts touch sensitivity depending on an input method occurring on a touch screen unit 160.

The controller 110 may increase a level of the touch sensitivity, if a tap input method, in which a touch is released within a predetermined time since occurrence of the touch, occurs on the touch screen unit 160. In contrast, the controller 110 may hold a default level of the touch sensitivity, if a move input method, in which a touch is released after a lapse of a predetermined time since occurrence of the touch, occurs on the touch screen unit 160.

The controller 110 may increase a level of the touch sensitivity if a tap input occurs on the touch screen unit 160 during an input mode. Meanwhile, the controller 110 may decrease the touch sensitivity to the default level, if no tap input occurs on the touch screen unit 160 within a predetermined time while performing the input mode with the tap input method with the level of the touch sensitivity increased.

The controller 110 may increase a level of the touch sensitivity, if a tap input occurs on a predetermined key in a key input unit displayed on the touch screen unit 160 during the input mode. However, the controller 110 may decrease the touch sensitivity to the default level, if no tap input occurs on a predetermined key within a predetermined time while performing the input mode with the tap input method with the level of the touch sensitivity increased.

When switching to the input mode, the controller 110 may perform the input mode with the tap input method by increasing a level of the touch sensitivity. The controller 110 may decrease the touch sensitivity to the default level, if no tap input occurs on the touch screen unit 160 within a predetermined time while performing the input mode with the tap input method in the input mode with the level of the touch sensitivity increased. On the other hand, the controller 110 may decrease the touch sensitivity to the default level, if no tap input occurs on a predetermined key within a predetermined time while performing the input mode with the tap input method in the input mode with the level of the touch sensitivity increased. The controller 110 may decrease the touch sensitivity to the default level if the input mode is terminated.

The controller 110 may control a touch sensitivity adjuster 127 to set, as a default level, a touch sensitivity level that is selected by a user on a widget or a touch sensitivity adjust menu.

A camera unit 140 includes a camera sensor for capturing image data and converting the captured optical signals into electrical signals, and a signal processor unit for converting analog image signals captured by the camera sensor into digital data. The camera sensor is assumed to be a Charge Coupled Device (CCD) or Complementary Metal-Oxide Semiconductor (CMOS) sensor, and the signal processor may be realized with a Digital Signal Processor (DSP). The camera sensor and the signal processor may be realized integrally or separately.

An image processor 150 performs Image Signal Processing (ISP) for displaying the image signals output from the camera unit 140 on the touch screen unit 160. The ISP performs functions such as gamma correction, interpolation, spatial conversion, image effects, image scaling, Automatic White Balance (AWB), Automatic Exposure (AE), and Automatic Focusing (AF). The image processor 150 processes the image signals output from the camera unit 140 on a frame basis, and outputs the frame image data according to characteristics and size of the touch screen unit 160. The image processor 150 including a video codec may compress the frame image data to be displayed on the touch screen unit 160 using a set coding scheme, and decompress the compressed frame image data into its original frame image data. The video codec may be any one of a Joint Photographic Experts Group (JPEG) codec, a Moving Picture Experts Group 4 (MPEG4), a Wavelet codec, etc. If the image signal processor 150 supports an On-Screen Display (OSD) feature, it may output OSD data according to the size of the displayed screen under control of the controller 110.

The touch screen unit 160 displays the image signals output from the image signal processor 150 on a screen thereof, and also displays user data output from the controller 110 on the screen. The touch screen unit 160 may include a display unit and an input unit. On the input unit of the touch screen unit 160 may be displayed a key input unit that includes alphanumeric keys for inputting alphanumeric information and function keys for setting various functions.

The touch sensitivity adjuster 127 adjusts touch sensitivity of the touch screen unit 160, and sets an intermediate level among the levels of touch sensitivity, as a default level. In accordance with an alternate embodiment of the present invention, the touch sensitivity adjuster 127 may set a touch sensitivity level selected by the user as a default level.

Hereinafter, an operation of adjusting touch sensitivity depending on an input method in a mobile terminal will be described in detail with reference to FIGS. 2 and 3.

Figure 2:
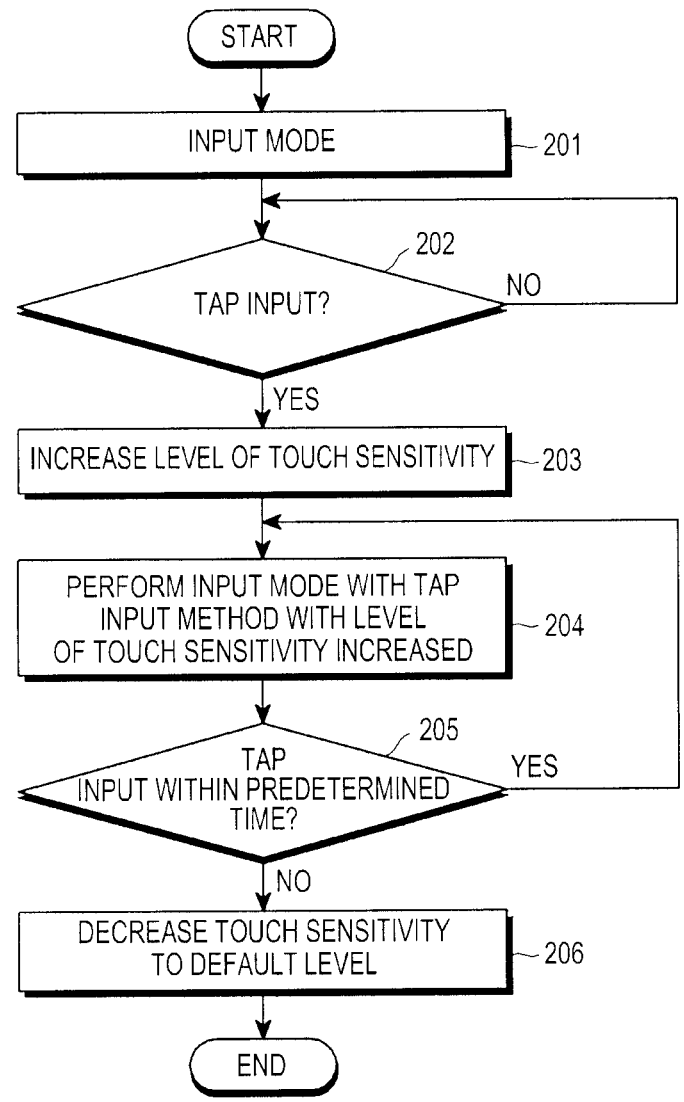
FIG. 2 is a flowchart illustrating a process of adjusting touch sensitivity in a mobile terminal according to an embodiment of the present invention.

FIG. 2 is a flowchart illustrating a process of adjusting touch sensitivity in a mobile terminal according to an embodiment of the present invention.

The proposed touch sensitivity adjusting method will be described in detail with reference to FIG. 1.

Referring to FIG. 2, the controller 110 displays a display unit and an input unit on the touch screen unit 160 during an input mode of the mobile terminal in step 201. The input mode represents a mode in which characters and symbols may be input on a key input unit, such as a number input mode for text messaging, instant messaging and calls.

The key input unit screen is displayed on the input screen of the touch screen unit 160. The controller 110 determines in step 202 whether a tap input occurs on a predetermined key of the key input screen.

If so, the controller 110 increases a level of the touch sensitivity which is presently set as a default level, in step 203. For example, if a default level of the current touch sensitivity is an intermediate level of "3", the controller 110 may increase the level of the touch sensitivity to a level of "2" or higher.

Thereafter, in step 204, the controller 110 performs the input mode with a tap input method, with the level of the touch sensitivity increased.

The controller 110 determines in step 205 whether a tap input occurs on a predetermined key in the key input screen of the touch screen unit 160 within a predetermined time period, while performing the input mode with the tap input method with the increased level of the touch sensitivity of step 203. For example, when inputting the key by tap input method, if a lead time from a time when one key is input to a time when a next key is input, is 1 sec., then it is assumed that a predetermined time period capable of detecting that the tap input method does not occur, is 5 seconds.

If no tap input occurs on a predetermined key in the key input unit of the touch screen unit 160 within a predetermined time in step 205, the controller 110 decreases a level of the touch sensitivity to the default level in step 206. For example, the controller 110 may adjust the current level "2" of the touch sensitivity to the default level of "3" or lower.

When the touch sensitivity is set to the default level, the controller 110 may perform a function corresponding to a move input, such as for gestures or handwritings, occurring on the touch screen unit 160.

In summary, the controller 110 may perform an accurate input by automatically adjusting or increasing a level of the touch sensitivity to a predetermined level if a tap input occurs on the touch screen unit 160, and thereafter may perform a function according to a move input method on the touch screen unit 160 by automatically adjusting the touch sensitivity to the set default level if no tap input occurs on the touch screen 160 within a predetermined time.

Figure 3:
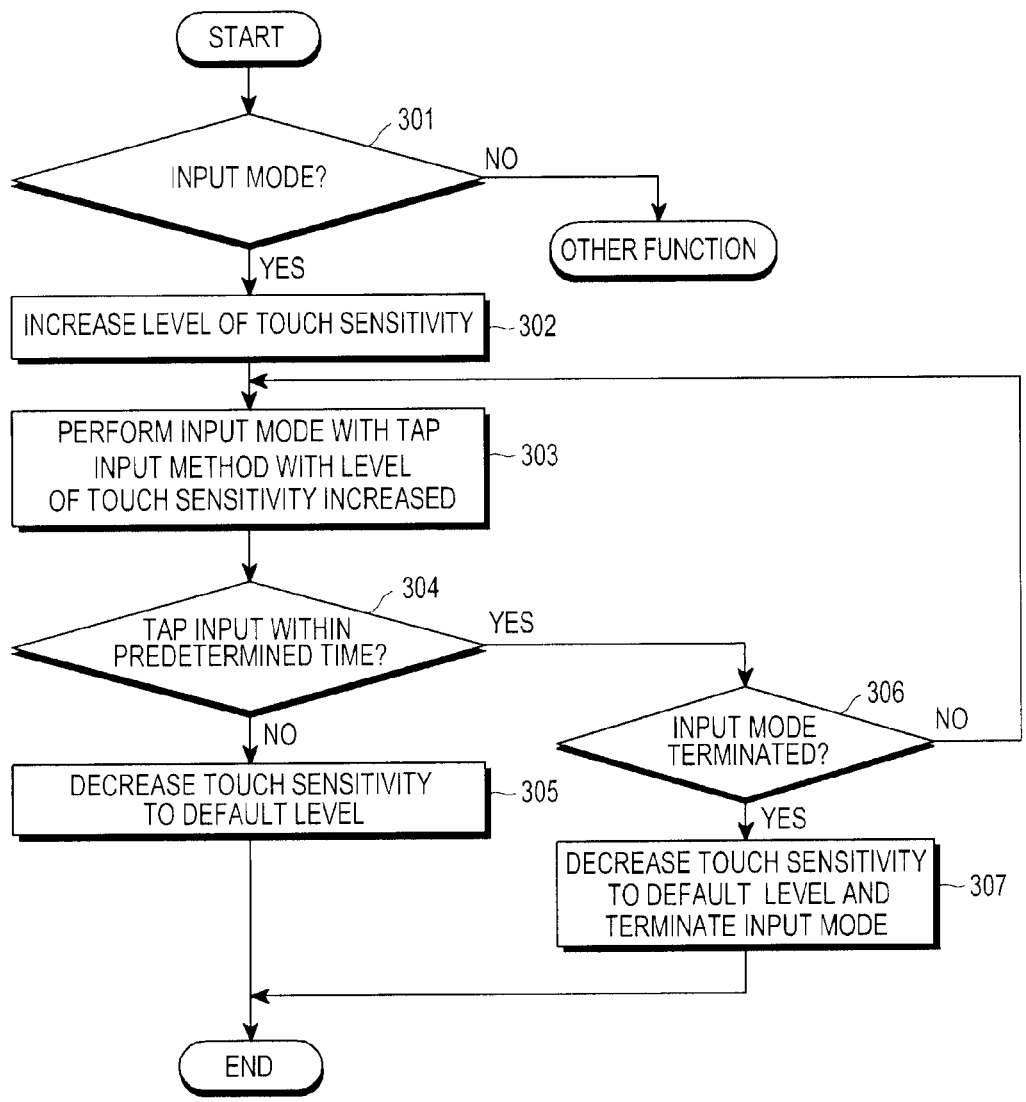
FIG. 3 is a flowchart illustrating a process of adjusting touch sensitivity in a mobile terminal according to another embodiment of the present invention.

FIG. 3 is a flowchart illustrating a process of adjusting touch sensitivity in a mobile terminal according to another embodiment of the present invention.

The proposed touch sensitivity adjusting method will be described in detail with reference to FIG. 1.

Referring to FIG. 3, the controller 110 determines in step 301 whether an input mode is selected in the mobile terminal. If so, the controller 110 increases a level of the touch sensitivity which is presently set as a default level, in step 302. For example, if a default level of the current touch sensitivity is an intermediate level of "3", the controller 110 may increase the level of the touch sensitivity to a level of "2".

The controller 110 displays a display unit and an input unit on the touch screen unit 160 in an input mode of the mobile terminal. The input mode represents a mode in which characters and symbols may be input on a key input unit, such as a number input mode for text messaging, instant messaging and calls.

The key input unit is displayed on the input unit of the touch screen unit 160. If a tap input occurs on a predetermined key in the key input unit, the controller 110 performs the input mode with the tap input method with the level of the touch sensitivity increased, in step 303.

The controller 110 determines in step 304 whether a tap input occurs on a predetermined key in the key input unit of the touch screen unit 160 within a predetermined time, while performing the input mode with the tap input method with the level of the touch sensitivity increased.

If no tap input occurs on a predetermined key in the key input unit of the touch screen unit 160 within a predetermined time in step 304, the controller 110 decreases a level of the touch sensitivity to the default level in step 305. For example, the controller 110 may adjust the current level "2" of the touch sensitivity to the default level of "3" or lower. Note that if the tap input method of a predetermined key occurs within a predetermined time period, it maintains step 303 performing input mode by the tap input method in increased state of level of touch sensitivity.

When the touch sensitivity is set to the default level, the controller 110 may perform a function corresponding to a move input occurring on the touch screen unit 160.

The controller 110 determines in step 306 whether termination of the input mode is selected, while performing the input mode with the tap input method with the level of the touch sensitivity increased, in step 303. If so, the controller 110 terminates the input mode and decreases the touch sensitivity level to the default level in step 307.

In summary, the controller 110 may perform an accurate input by automatically adjusting or increasing a level of the touch sensitivity to a predetermined level if a tap input occurs on the touch screen unit 160, and may perform a function according to a move input method on the touch screen unit 160 by automatically adjusting the touch sensitivity to the set default level if no tap input occurs on the touch screen 160 within a predetermined time.

The controller 110 may perform an accurate input by automatically adjusting or increasing a level of the touch sensitivity to a predetermined level during an input mode where the tap input method is mainly used, and may perform a function according to a move input method on the touch screen unit 160 by automatically adjusting the touch sensitivity to the set default level if no tap input occurs on the touch screen 160 within a predetermined time or if the input mode is terminated.

As is apparent from the foregoing description, the proposed touch sensitivity adjusting apparatus and method may automatically adjust touch sensitivity depending on an input method on a touch screen in a mobile terminal, allowing the user to perform fast and accurate input actions.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for adjusting touch sensitivity in a mobile terminal, comprising:
   a touch screen; and
   a controller for
      detecting a touch input on the touch screen,
      detecting a time period that the touch input is maintained;
      determining whether the detected touch input is a tap input or a move input based on the detected time period; and
      adjusting touch sensitivity of the touch screen according to the determined outcome to increase a level of the touch sensitivity upon occurrence of the tap input when the detected touch input is maintained for less than a predetermined time period, and to revert the level of the touch sensitivity back to a default level when the detected touch input is released after a lapse of the predetermined time period,
wherein when the detected touch input is the move input, the controller further maintains the default level of the touch sensitivity of the touch screen.

2. The apparatus of claim 1, wherein after increasing the touch sensitivity the controller reverts the touch sensitivity to the default level if a second tap touch input is not detected on the touch screen within a second predetermined time period after detection of the touch input.

3. The apparatus of claim 1, wherein the touch input is received on a predetermined key displayed on the touch screen, and after increasing the touch sensitivity, the controller:
  decreases the touch sensitivity to the default level when no second touch input is detected on the predetermined key within a second predetermined time period after detection of the touch input on the predetermined key.

4. The apparatus of claim 1, wherein an input mode is activated in response to the touch input, and the controller:
  increases the touch sensitivity in response to activation of the input mode, and
  decreases the touch sensitivity to the default level when the input mode is terminated.

5. The apparatus of claim 4, wherein after increasing the touch sensitivity the controller decreases the touch sensitivity to the default level when a second touch input is not detected within a second predetermined time period after detection of the touch input.

6. The apparatus of claim 4, wherein after increasing the touch sensitivity, the controller decreases the touch sensitivity to the default level when a second touch input is not detected on a predetermined key within a second predetermined time period after detection of the touch input.

7. The apparatus of claim 1, further comprising:
  a touch sensitivity adjuster for setting the level of the touch sensitivity.

8. The apparatus of claim 1, wherein when the detected touch input is the tap input, the controller further increases a level of the touch sensitivity of the touch screen.

9. A method for adjusting touch sensitivity in a mobile terminal, comprising:
  detecting a touch input occurring on a touch screen;
  detecting a time period that the touch input is maintained;
  determining whether the detected touch input is a tap input or a move input based on the detected time period; and
  adjusting touch sensitivity of the touch screen according to the determined outcome to increase a level of the touch sensitivity upon occurrence of the tap input when the detected touch input is maintained for less than a predetermined time period, revert the level of the touch sensitivity back to a default level when the detected touch input is released after a lapse of the predetermined time period, and maintain the default level of the touch sensitivity of the touch screen when the detected touch input is the move input.

10. The method of claim 9, further comprising: after increasing the touch sensitivity, reverting the touch sensitivity to the default level if a second tap touch input is not detected on the touch screen within a second predetermined time period after detection of the touch input.

11. The method of claim 9, wherein the touch input is received on a predetermined key displayed on the touch screen, the method further comprising:
  after increasing the touch sensitivity, decreasing the sensitivity to the default level when no second touch input is detected on the predetermined key within a second predetermined time period after detection of the touch input on the predetermined key.

12. The method of claim 9, wherein an input mode is activated in response to the touch input, the method further comprising:
  increasing the touch sensitivity in response to activation of an input mode; and
  after increasing the touch sensitivity, decreasing the touch sensitivity to the default level when the input mode is terminated.

13. The method of claim 12, further comprising after increasing the touch sensitivity, decreasing the touch sensitivity to the default level when a second touch input is not detected within a second predetermined time period after detection of the touch input.

14. The method of claim 12, further comprising decreasing the touch sensitivity to the default level when a second touch input is not detected on a predetermined key within a second predetermined time period after detection of the touch input.

15. The method of claim 9, further comprising increasing a level of the touch sensitivity of the touch screen when the detected touch input is the tap input.

* * * * *